United States Patent [19]

Spatafora et al.

[11] Patent Number: 5,301,792
[45] Date of Patent: Apr. 12, 1994

[54] UNIT FOR TRANSFERRING FOOD PRODUCTS, SUCH AS CHOCOLATES, BETWEEN PRODUCTION MACHINES

[75] Inventors: Mario Spatafora; Giulio Strazzari, both of Bologna, Italy

[73] Assignee: Azionaria Costruzioni Macchine Automatiche A.C.M.A. S.p.A., Bologna, Italy

[21] Appl. No.: 979,268

[22] Filed: Nov. 20, 1992

[30] Foreign Application Priority Data

Nov. 20, 1991 [IT] Italy .................. BO91A 000432

[51] Int. Cl.⁵ .................................. B65G 15/00
[52] U.S. Cl. ..................... 198/408; 198/463.4; 198/481.1; 198/624
[58] Field of Search ............. 198/624, 408, 463.4, 198/481.1

[56] References Cited

U.S. PATENT DOCUMENTS

| | | |
|---|---|---|
| 2,819,785 | 1/1958 | Kay et al. |
| 4,273,235 | 6/1981 | Rustand .............. 198/624 X |
| 4,308,942 | 1/1982 | Ackley ............... 198/408 X |
| 4,793,461 | 12/1988 | Leonard ............ 198/463.4 X |
| 4,958,556 | 9/1990 | Aquino et al. ....... 198/463.4 X |

FOREIGN PATENT DOCUMENTS

| | | | |
|---|---|---|---|
| 45101 | 1/1951 | Belgium ............. | 198/481.1 |
| 74962 | 1/1954 | Netherlands. | |
| 2239227 | 6/1991 | United Kingdom. | |

OTHER PUBLICATIONS

Patent Abstracts of Japan, vol. 10, No. 238 (M-508)(2294), Aug. 16, 1986, JP-A-61 69 617.

Primary Examiner—Cheryl L. Gastineau
Attorney, Agent, or Firm—Oblon, Spivak, McClelland, Maier & Neustadt

[57] ABSTRACT

A unit for transferring food products such as chocolates, whereby a conveyor feeds a compact sequence of mutually contacting products in a given direction to a transfer device by which the products are fed one by one, still in one direction, into respective peripheral seats on a conveyor wheel rotating about an axis perpendicular to the aforementioned direction; the transfer device being defined by a counter-rotating lobed wheel located on either side of the conveyor and defining a movable pocket for conveying each product.

2 Claims, 1 Drawing Sheet

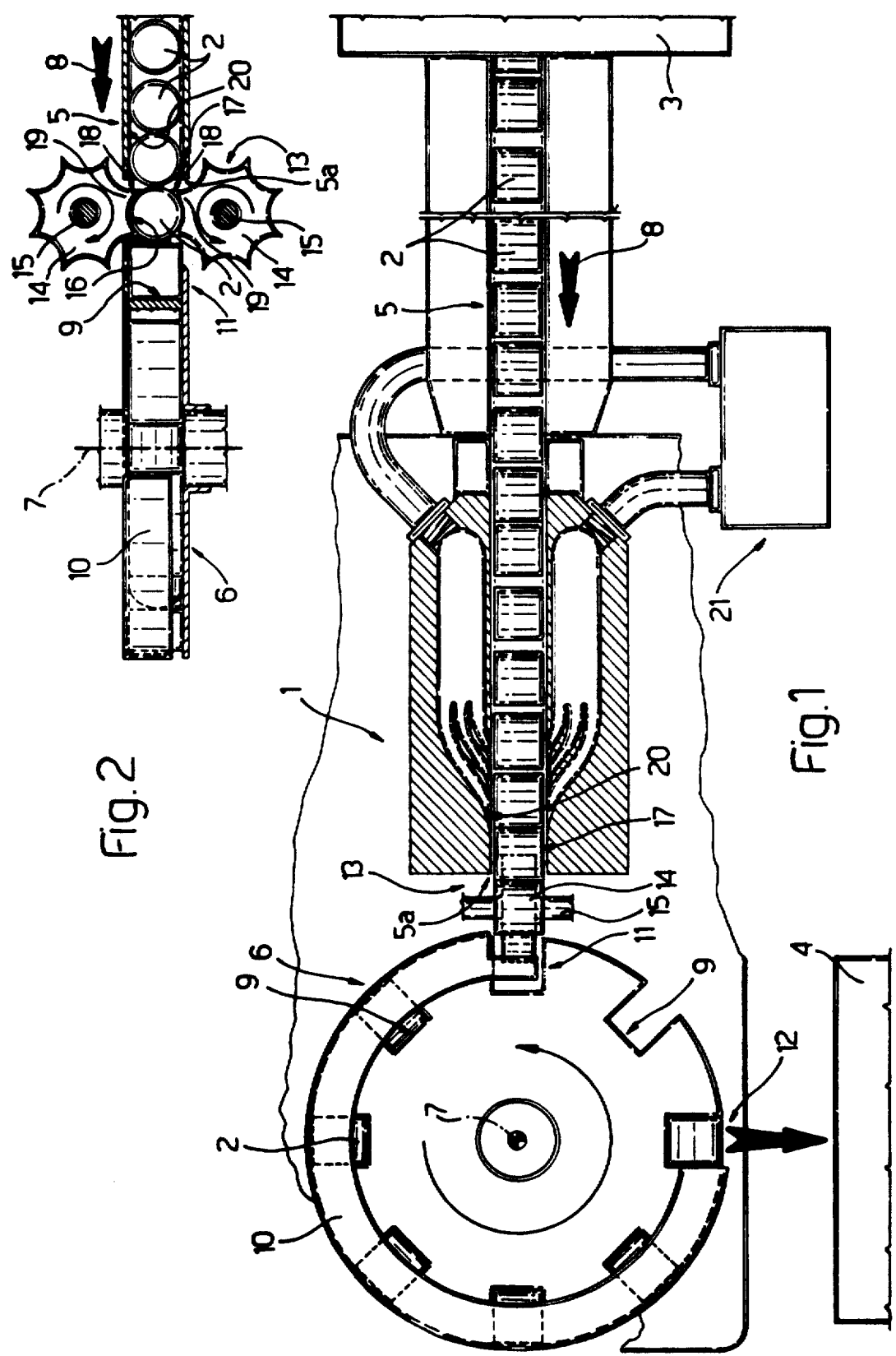

UNIT FOR TRANSFERRING FOOD PRODUCTS, SUCH AS CHOCOLATES, BETWEEN PRODUCTION MACHINES

BACKGROUND OF THE INVENTION

1. Field of the Invention

The present invention relates to a unit for transferring food products, such as chocolates, between production machines

2. Discussion of the Background

Though the following description relates to the food industry, and more specifically to the transfer of chocolates or sweets between a manufacturing machine and a wrapping line, the same obviously also applies to the transfer between production machines of fragile, relatively small size products of any sort.

In the food industry, chocolate manufacturing machines are normally connected to the wrapping line via a transfer unit by which the chocolates coming off the machine are fed successively on a conveyor and in a first direction towards a stop member against which the chocolates are accumulated and engaged successively by a reciprocating pusher by which they are fed in a second direction, perpendicular to the first, into respective seats on a conveyor or wrapping wheel mounted for rotation about an axis parallel to the first direction.

Known transfer units of the aforementioned type present several drawbacks, foremost of which are the high noise level resulting from the presence of a reciprocating member as represented by the pusher, and the relatively low operating speed of the unit due to stoppage and the change in direction of the chocolates prior to being fed on to the conveyor wheel.

SUMMARY OF THE INVENTION

It is an object of the present invention to provide a transfer unit designed to overcome the aforementioned drawbacks.

According to the present invention, there is provided a unit for transferring food products, e.g. chocolates, comprising a conveyor for feeding a compact sequence of mutually contacting products in a given direction; a conveyor wheel adjacent to the output end of the conveyor and having a number of peripheral seats, each receiving a respective product; and a transfer device for successively feeding the products from the conveyor to the respective said seats on the conveyor wheel; characterized by the fact that the conveyor wheel is mounted for rotation about an axis perpendicular to said direction, and with its outer edge facing said output end; and that said transfer device comprises pocket conveyor means defining a pocket for conveying each said product; said conveyor means traveling in such a manner as to feed said pocket in said direction.

The pocket conveyor means preferably comprise two counter-rotating lobed wheels located on either side of the conveyor and defining said pocket.

BRIEF DESCRIPTION OF THE DRAWINGS

A non-limiting embodiment of the present invention will be described by way of example with reference to the accompanying drawings, in which:

FIG. 1 shows a partially sectioned side view, with parts removed for simplicity, of a preferred embodiment of the transfer unit according to the present invention;

FIG. 2 shows a partial plan view, with parts removed for simplicity, of the FIG. 1 unit.

DESCRIPTION OF THE PREFERRED EMBODIMENT

Number 1 in the accompanying drawings indicates a unit for transferring chocolates 2 from a manufacturing machine 3 to a production machine consisting in the example shown of a wrapping line 4.

Unit 1 comprises a horizontal conveyor belt 5 having a first end connected to the output of machine 3, and a second end 5a facing the outer edge of a conveyor or wrapping wheel 6 rotated intermittently by a known drive device (not shown) about an axis 7 substantially coplanar with conveyor 5 and perpendicular to the traveling direction 8 of conveyor 5 towards wheel 6.

Wheel 6 presents a number of peripheral seats 9 traveling in steps, inside a curved housing 10, between a loading station 11, wherein each seat 9 receives a respective chocolate 2 off the conveyor 5, and an unloading station 12, wherein chocolates 2 are withdrawn successively from respective seats 9 by known extracting means (not shown) and fed on to line 4 by known feeding means (not shown).

The chocolates 2 are transferred successively between second end 5a of conveyor 5 and respective seats 9 on wheel 6 by a transfer device 13 comprising, as shown more clearly in FIG. 2, two lobed wheels 14 substantially coplanar with axis 7 and located on either side of second end 5a of conveyor 5 at loading station 11. By means of a known drive device (not shown), wheels 14 are rotated at the same speed and in opposite directions about respective shafts 15 perpendicular to axis 7 and direction 8, so as to define a movable pocket or seat 16 for receiving a chocolate 2 off the conveyor 5 and feeding it, still in direction 8, into a respective seat 9 arrested at the loading station 11.

For ensuring conveyor 5 presents at all times a compact column 17 of chocolates 2 contacting wheel 14, and more specifically contacting chocolate 2 in seat 16 (FIG. 2) and the movable locating surface 18 defined by the two rear lobes 19 of seat 16, an end portion of conveyor 5 close to second end 5a extends along a chamber 20 through which air is blown in direction 8 by a device 21 and at a greater speed than that of conveyor 5, so that chocolates 2 accumulate contacting one another against transfer device 13.

In lieu of blowing device 21, said compact column 17 contacting movable locating surface 18 may obviously be formed, for example, by increasing the speed of conveyor 5, or, according to a variation not shown, by providing, at second end 5a of conveyor 5, an intermittent gripping device for arresting the chocolate 2 immediately upstream from transfer device 13 in direction 8.

On reaching second or output end 5a of conveyor 5, the chocolates 2 are thus fed by transfer device 13 substantially continuously, and still in direction 8, into respective seats 9, i.e. with no stoppage or sharp changes in direction which could result in damage to the chocolates over and above a given operating speed.

We claim:

1. A unit for transferring food products, which comprises:
   a conveyor for feeding a compact sequence of mutually contacting products in a direction of feeding;
   a conveyor wheel located adjacent an output end of the conveyor and having a plurality of peripheral seats, each of said seats receiving a respective product; and a transfer device for successively feeding the products from the conveyor to the respective seats on the conveyor wheel, the conveyor wheel being mounted for rotation about a first axis perpendicular to said direction of feeding wherein an outer edge of said conveyor wheel faces said output end of the conveyor;

the transfer device including a pocket conveyor which includes a lobed wheel located on either side of said conveyor for counter-rotating so as to define a pocket for conveying each of said products wherein said pocket conveyor operates in such a manner as to feed said pocket in said direction of feeding.

2. A unit as claimed in claim 1, wherein said lobed wheel on either side of said conveyor are each respectively mounted for rotation about a second and third axis perpendicular to said first axis and perpendicular to said direction of feeding.

* * * * *